(12) United States Patent
Hamauzu et al.

(10) Patent No.: US 8,877,339 B2
(45) Date of Patent: Nov. 4, 2014

(54) SODIUM HEXATITANATE AND METHOD FOR PRODUCTION THEREOF (75) Inventors: Takashi Hamauzu, Tokushima (JP); Nobuki Itoi, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 375 days.

(21) Appl. No.: 12/451,925

(22) PCT Filed: Jun. 2, 2008

(86) PCT No.: PCT/JP2008/060167
§ 371 (c)(1),
(2), (4) Date: Dec. 7, 2009

(87) PCT Pub. No.: WO2008/149845
PCT Pub. Date: Dec. 11, 2008

(65) Prior Publication Data
US 2010/0119826 A1    May 13, 2010

(30) Foreign Application Priority Data
Jun. 8, 2007 (JP) .................. 2007-153083

(51) Int. Cl.
| B32B 5/16 | (2006.01) |
| C01D 1/02 | (2006.01) |
| C01G 23/04 | (2006.01) |
| F16D 69/02 | (2006.01) |
| C01G 23/00 | (2006.01) |
| C08L 21/00 | (2006.01) |

(52) U.S. Cl.
CPC ........... *C01G 23/005* (2013.01); *C01P 2006/22* (2013.01); *F16D 69/028* (2013.01); *C01P 2002/72* (2013.01); *C08L 21/00* (2013.01); *C01P 2006/12* (2013.01); *C01P 2004/51* (2013.01); *F16D 69/026* (2013.01); *C01P 2004/03* (2013.01); *C01P 2004/61* (2013.01)
USPC ........ 428/402; 423/179; 423/594.15; 423/598

(58) Field of Classification Search
USPC .............. 428/402; 423/179, 598, 594, 594.15
See application file for complete search history.

(56) References Cited

U.S. PATENT DOCUMENTS

| 6,036,938 | A  * | 3/2000 | Konnai et al. | ................. 423/598 |
| 6,677,041 | B1 * | 1/2004 | Ogawa et al. | ................. 428/402 |
| 7,901,659 | B2 * | 3/2011 | Itoi | ........................ 423/594.15 |
| 8,241,595 | B2 * | 8/2012 | Itoi | ................................ 423/202 |
| 2008/0249222 | A1* | 10/2008 | Itoi | ............................... 524/413 |

FOREIGN PATENT DOCUMENTS

| EP | 1035156 A1 | 9/2000 |
| EP | 1440940 A1 | 7/2004 |
| EP | 2138461 A1 | 12/2009 |
| JP | 63-252927 A | 10/1988 |

(Continued)

OTHER PUBLICATIONS

Online machine translation of JP-07-196817 (Aug. 1, 1995).*

(Continued)

*Primary Examiner* — Holly Le
(74) *Attorney, Agent, or Firm* — Kubovcik & Kubovcik

(57) ABSTRACT

Sodium hexatitanate having a mean particle diameter in the range of 2-5 μm and an indeterminate shape, and is either obtained by firing a milled mixture obtained as a result of mechanochemical milling of a titanium source and a sodium source or prepared from sodium trititanate obtained by firing a milled mixture obtained as a result of mechanochemical milling of a titanium source and a sodium source.

12 Claims, 9 Drawing Sheets

EXAMPLE 1 (DIRECT) MAGNIFICATION 10,000

MAGNIFICATION 10,000

(56) References Cited

FOREIGN PATENT DOCUMENTS

| | | | |
|---|---|---|---|
| JP | 03-028126 | A | 2/1991 |
| JP | 07-053214 | A | 2/1995 |
| JP | 07-196817 | A | 8/1995 |
| JP | 07-206440 | A | 8/1995 |
| JP | 11-130433 | A | 5/1999 |
| JP | 2000-264689 | A | 9/2000 |
| JP | 2000-264692 | A | 9/2000 |
| JP | 2003-335519 | * | 11/2003 |
| JP | 2003-335519 | A | 11/2003 |

OTHER PUBLICATIONS

Online translation of JP 2003-335519 (Nov. 25, 2003).*

Chinese Office Action dated Nov. 10, 2010, issued in Chinese Patent Application No. 20080019335.0 and English translation thereof.

Jose F. Fernandez-Bertran, "Mechanochemistry: an overview", Pure. Appl. Chem., vol. 71, No. 4, pp. 581-586, 1989.

Search Report dated Nov. 19, 2012, in EP Application No. 08 76 4980.2-2111.

* cited by examiner

FIG. 1

EXAMPLE 1 (DIRECT) MAGNIFICATION 15,000    MAGNIFICATION 10,000

EXAMPLE 1    BEFORE DISINTEGRATION          AFTER 120 min. FROM DISINTEGRATION

FIG. 8

EXAMPLE 2    BEFORE DISINTEGRATION          AFTER 120 min. FROM DISINTEGRATION

FIG. 9

COMP. EX. 1   BEFORE DISINTEGRATION          AFTER 120 min. FROM DISINTEGRATION

SODIUM HEXATITANATE AND METHOD FOR PRODUCTION THEREOF

This application is a 371 of international application PCT/JP2008/060167, filed Jun. 2, 2008, which claims priority based on Japanese patent application No. 2007-153083 filed Jun. 8, 2007, which is incorporated herein by reference.

TECHNICAL FIELD

The present invention relates to sodium hexatitanate and its manufacturing method.

BACKGROUND ART

Potassium titanate fiber, which is not a cancer-causing substance such as asbestos, has been widely used as a friction modifier, chiefly for incorporation in a vehicle brake pad. A friction material containing such potassium titanate fibers has a very favorable advantage that it causes no damage to a brake disk while exhibiting an excellent sliding property and a good braking effect.

However, the friction material containing potassium titanate fibers exhibits a low friction coefficient in a low-temperature range. In order for the friction material to accommodate increase in speed of the vehicle and reduction in size and weight of the braking device, it must excel in friction resistance, have a higher friction coefficient and can sustain this high friction coefficient over a wide temperature range from a low-temperature range to a high-temperature range.

In the effort to solve such problems, a friction material has been proposed which contains sodium hexatitanate fibers (Patent Literature 1).

However, there still remains a need for a friction modifier which can further improve wear resistance, particularly in a high-temperature range, of a friction material.

Patent Literature 1: Japanese Patent Laid-Open No. Hei 07-196817

DISCLOSURE OF THE INVENTION

It is an object of the invention to provide sodium hexatitanate which has a novel shape, shows superior wear resistance in a friction material and exhibits an excellent reinforcing performance in a resin composition, a method for manufacturing the sodium hexatitanate, a friction material containing the sodium hexatitanate and a resin composition containing the sodium hexatitanate.

The sodium hexatitanate of the present invention is characterized as having a mean particle diameter (median diameter) in the range of 2-5 μm and an indeterminate shape.

The sodium hexatitanate of the present invention has a novel shape and, when used as a friction modifier, can impart superior friction resistance to a friction material. Also, it shows an excellent reinforcing performance when mixed in a resin.

The mean particle diameter in the present invention can be measured by a laser diffraction type particle-size distribution measurement device.

Also, the sodium hexatitanate of the present invention preferably has a specific surface area of 2-4 $m^2/g$. This specific surface area can be measure by a low-temperature gas adsorption method (BET multipoint method) according to a dynamic pressure constant method.

The sodium hexatitanate of the present invention has an indeterminate shape. Accordingly, it has an irregular shape, as contrary to the conventional sodium hexatitanate which has a fibrous, platy or granular shape. Specifically, it has such a configuration that plural prismoidal particles are integrated in a randomly oriented fashion. It is accordingly different in configuration from a secondary particle produced through agglomeration of prismoidal primary particles.

The sodium hexatitanate of the present invention can be obtained by firing a milled mixture obtained as a result of mechanochemical milling of a titanium source and a sodium source.

The sodium hexatitanate of the present invention can also be prepared from sodium trititanate obtained by firing a milled mixture obtained through mechanochemical milling of a titanium source and a sodium source. More specifically, the sodium trititanate obtained by firing the milled mixture is subjected to an acid treatment that dissolves a sodium content and then fired to obtain the sodium hexatitanate of the present invention.

The sodium hexatitanate in accordance with an embodiment of the present invention is characterized that it is obtained by firing a milled mixture obtained as a result of mechanochemical milling of a titanium source and a sodium source.

Also, the sodium hexatitanate in accordance with another embodiment of the present invention is characterized that it is obtained by subjecting sodium trititanate obtained through mechanochemical milling of a titanium source and a sodium source to an acid treatment that dissolves a sodium content and then to firing.

A method (a) of the present invention for manufacture of sodium hexatitanate is characterized as including the steps of mixing a titanium source and a sodium source while milling them mechanochemically and firing the milled mixture.

A method (b) of the present invention for manufacture of sodium hexatitanate is characterized as including the steps of mixing a titanium source and a sodium source while milling them mechanochemically, firing the milled mixture to prepare sodium trititanate and, subsequent to an acid treatment that dissolves a sodium content, firing the sodium trititanate.

In the manufacturing methods of the present invention, the milled mixture obtained as a result of mixing a titanium source and a sodium source while milling them mechanochemically is highly reactive.

A useful titanium source is a compound which contains titanium oxide. Specific examples of titanium sources include titanium oxide, rutile ore, titanium hydroxide wet cake and hydrated titania.

A useful sodium source is a compound which when heated produces sodium oxide. Specific examples of sodium sources include sodium oxide, sodium carbonate, sodium hydroxide and sodium nitrate. The use of sodium carbonate, among them, is particularly preferred.

In the preceding manufacturing method (a), the milled mixture of titanium and sodium sources is fired to thereby prepare sodium hexatitanate. Accordingly, in the manufacturing method (a), a standard blending proportion of the titanium source and sodium source is preferably Ti:Na=6.0:1.0 (molar ratio). Preferably, Ti falls within the approximate range of 6.0±5%.

In the preceding manufacturing method (b), the milled mixture of titanium and sodium sources is fired to prepare sodium trititanate. Accordingly, a standard blending proportion of the titanium source and sodium source is preferably Ti:Na=3.0:1.0 (molar ratio). Preferably, Ti falls within the approximate range of 3.0±5%.

If the blending proportion of the titanium and sodium sources falls outside the specified range, the desired sodium hexatitanate or trititanate may not be obtained.

In the present invention, mechanochemical milling may be effected by a method wherein milling is carried out while giving a physical impact, for example. Specifically, milling may be achieved by a vibration mill. When milling is carried out using a vibration mill, a shear stress is produced in the powder-form mixture due to milling. This shear stress is believed to induce simultaneous occurrence of disorder of an atomic configuration and reduction of an interatomic distance and accordingly cause atomic migration at contact point of dissimilar particles, resulting in obtaining a metastable phase. Such acquisition of the metastable phase is believed to result in obtaining the highly reactive milled mixture.

In the manufacturing method (a) of the present invention, the above-obtained milled mixture is fired to prepare sodium hexatitanate. A firing temperature of the milled mixture is preferably in the range of 650-1,000° C., more preferably in the range of 700-1,000° C., further preferably in the range of 860-950° C. A firing time is preferably 0.5 hours-6 hours, more preferably 3 hours-5 hours. If the firing temperature is excessively low or the firing time is excessively short, a particle diameter may decrease to result in the difficulty to obtain a single composition of indeterminate-form sodium titanate. On the other hand, if the firing temperature is excessively high or the firing time is excessively long, the sodium titanate may be rendered prismoidal in shape to result in the difficulty to obtain indeterminate-form sodium titanate.

In the manufacturing method (b) of the present invention, the milled mixture is fired to prepare sodium trititanate. The firing temperature and firing time are the same as described in the manufacturing method (a). The such-obtained sodium trititanate is subjected to an acid treatment that dissolves a sodium content. In this acid treatment, subsequent to addition of an acid, a pH preferably falls within the range of 6.5-7.5.

The acid for use in the acid treatment is not particularly specified. Examples of useful acids include inorganic acids such as sulfuric acid, hydrochloric acid and nitric acid; and organic acids such as acetic acid. These acids may be used in combination, if necessary.

After the sodium trititanate is subjected to the acid treatment that dissolves a sodium content, as described above, the resultant is preferably filtered as by suction and then dewatered. Firing follows dewatering to obtain a final product, i.e., the sodium hexatitanate of the present invention. A firing temperature is preferably in the range of 400-700° C., more preferably in the range of 500-650° C. A firing time is preferably 0.5 hours-4 hours, more preferably 0.5 hours-1 hour. If the firing temperature is excessively low or the firing time is excessively short, an XRD intensity of the sodium hexatitanate may decrease. On the other hand, if the firing temperature is excessively high or the firing time is excessively long, adhesion of powder particles to each other may result.

Firing of the milled mixture, as well as firing of the product obtained after the acid treatment, can be achieved by various types of firing means, including an electric furnace, rotary kiln, tube furnace, fluidized bed kiln and tunnel kiln.

After the firing, crushing and milling are performed using a jaw crusher, pin mill and the like. When necessary, screening, classification or the like may be performed.

As described above, the practice of the manufacturing method of the present invention results in the manufacture of the sodium hexatitanate of the present invention.

The friction material of the present invention is characterized as containing the sodium hexatitanate of the present invention as a friction modifier. Preferably, the sodium hexatitanate is contained in the range of 1-80% by weight. If the sodium hexatitanate of the present invention is contained in the amount of less than 1% by weight, it may become difficult for the sodium hexatitanate to exhibit its effect as a friction modifier, such as stability of a friction coefficient. If its content exceeds 80% by weight, pad formation may become difficult.

Due to the inclusion of the sodium hexatitanate of the present invention as a friction modifier, the friction material of the present invention can exhibit very stable friction and wear characteristics (wear resistance, friction coefficient, etc.) over a low to high temperature range. The detailed reason for the improvements in friction and wear characteristics when the sodium hexatitanate of the present invention is incorporated is not clear. It is however believed that the improved wear resistance and friction coefficient are attributed to the particular shape of the sodium hexatitanate of the present invention as noted above. Its stable composition even at high temperature is also believed to be a factor.

Accordingly, the friction material of the present invention can be used as a material for braking members incorporated in automobiles, railway vehicles, aircrafts and other various industrial apparatuses. For example, it can be used as a material for clutch facings or brakes such as brake linings and disc pads. It effectively improves and stabilizes their braking functions and further provides a service life improving effect.

Any binder conventionally used in the field of friction material can be used. Examples of binders include organic binders and inorganic binders. Examples of organic binders include thermosetting resins such as phenol resin, formaldehyde resin, melamine resin, epoxy resin, acrylic resin, aromatic polyester resin and urea resin; elastomers such as natural rubber, nitrile rubber, butadiene rubber, styrene-butadiene rubber, chloroprene rubber, polyisoprene rubber, acrylic rubber, high styrene rubber and styrene-propylene-diene copolymer; and thermoplastic resins such as polyamide resin, polyphenylene sulfide resin, polyether resin, polyimide resin, polyether ether ketone resin and thermoplastic liquid crystalline polyester resin. Examples of inorganic binders include alumina sol, silica sol and silicone resin. These binders can be used alone. In some cases, two or more binders which are compatible with each other may be used in combination.

The friction material of the present invention may contain a fibrous material. Any fibrous material conventionally used in this field can be used. Examples of fibrous materials include resin fibers such as aramid fibers, metal fibers such as steel fibers and brass fibers, carbon fibers, glass fibers, ceramic fibers, rock wool, wood pulps and the like. These fibrous materials may be used alone or in combination. For the purpose of improving dispersibility and adherence to the binder, such fibrous material may be surface treated with a silane coupling agent such as an amino, epoxy or vinyl silane coupling agent, a titanate coupling agent, a phosphate ester or the like.

The friction material of the present invention may also contain a friction modifier conventionally used in this field within the range that does not impair the desired effect of the friction material. Examples of such friction modifiers include organic powders such as vulcanized or unvulcanized natural or synthetic rubber powder, cashew resin powder, resin dust and rubber dust; inorganic powders such as carbon black, graphite powder, molybdenum disulfide, barium sulfate, calcium carbonate, clay, mica, talc, diatomite, antigorite, sepiolite, montmorillonite, zeolite, sodium trititanate, sodium hexatitanate, potassium hexatitanate and potassium octatitanate; metal powders such as copper, aluminum, zinc and iron; oxide powders such as alumina, silica, chromium oxide, titanium oxide and iron oxide; and the like. These conventional friction modifiers may be used alone or in combination when necessary.

The friction material of the present invention may further contain one or more of a rust inhibitor, a lubricant, an abrasive and the like.

The blending proportion of components in the friction material of the present invention can be suitably selected from a wide range depending upon various conditions including the type of the binder used; the types of the optionally incorporated fibrous material, conventional friction modifier and other additives; the sliding and mechanical properties required for the target friction material and the contemplated use purposes of the friction material. In general, the binder may be contained in the amount of 5-60% by weight (preferably 10-40% by weight), the friction modifier in the amount of 1-80% by weight (preferably 3-50% by weight), the fibrous material in the amount of up to 60% by weight (preferably 1-40% by weight) and the other additives in the amount of up to 60% by weight, all based on the total weight of the friction material.

The friction material of the present invention can be manufactured in accordance with a conventionally-known method for manufacturing a friction material. For example, a fibrous material, if necessary, is dispersed in a binder. A friction modifier and other optional components are subsequently added, either in a mixed form or separately, to the dispersion. The resulting mixture is then poured in a mold where it is heat compressed into an integral form.

Alternatively, a binder may be melt kneaded in a twin-screw extruder into which a friction modifier, an optional fibrous material and other optional components are introduced, either in a mixed form or separately, from a side hopper. The melt mixture is extruded and then machined to a desired shape.

Alternatively, a fibrous material, if necessary, may be dispersed in a binder. A friction modifier and other optional components are subsequently added to the dispersion. The resulting mixture is dispersed in water or the like, caught on a net and then dewatered to provide a sheet web which is subsequently heat compressed by a pressing machine into an integral form. The resultant is appropriately cut and/or abrasive machined to a desired shape.

Effect of the Invention

The sodium hexatitanate of the present invention has a novel shape and can impart excellent wear resistance when used as a friction modifier for a friction material.

BEST MODE FOR CARRYING OUT THE PRESENT INVENTION

The following specific examples illustrate the present invention but are not intended to be limiting thereof.

Example 1

Direct Method

In this Example, sodium hexatitanate was prepared according to the manufacturing method (a) of the present invention.

(Preparation of Milled Mixture)

655 g of titanium oxide and 145 g of sodium carbonate were mixed in a Henshel mixer. The resulting mixture was further mixed while milled in a vibration mill for 0.5 hours. Ti:Na (molar ratio) was 6.0:1.0.

(Firing)

The thus-obtained milled mixture, weighing 50 g, was packed in a crucible and fired in an electric furnace at 900° C. for 4 hours. The obtained product was used to prepare 450 ml of a 10 wt. % slurry, followed by 3 hours of stirring. This slurry was separated by filtration, dried and then fired in an electric furnace at 550° C. for 1 hour.

The product obtained as a result of the firing was disintegrated by a hammer mill to obtain 31.8 g of sodium hexatitanate.

Figure 1:
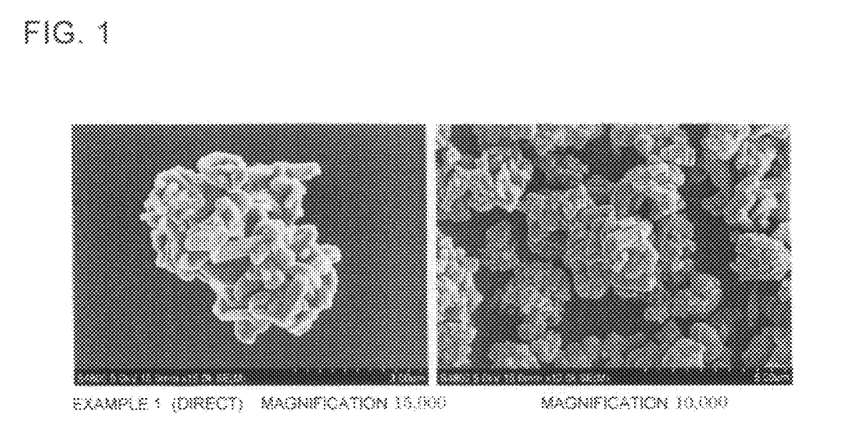
FIG. 1 is a photomicrograph taken using a scanning electron microscope, showing the sodium hexatitanate in Example 1 in accordance with the present invention.

This sodium hexatitanate was observed with a scanning electron microscope (SEM). FIG. 1 is a photomicrograph of the sodium hexatitanate when taken using a scanning electron microscope.

As can be clearly seen from FIG. 1, the obtained sodium hexatitanate has an indeterminate shape and is configured such that plural prismoidal particles are integrated in a randomly oriented fashion.

The sodium hexatitanate obtained was confirmed as having a composition of $Na_2Ti_6O_{13}$ by fluorescent X-ray analysis.

Figure 2:
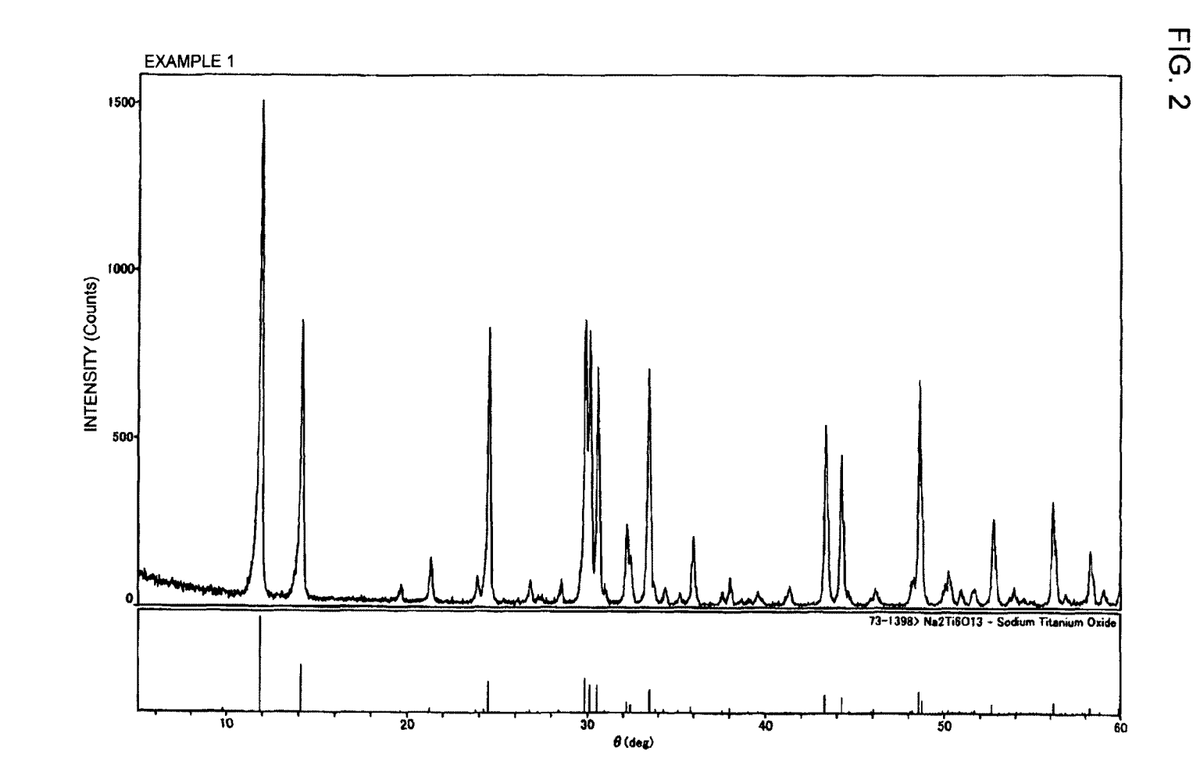
FIG. 2 shows an X-ray diffraction chart of the sodium hexatitanate obtained in Example 1 in accordance with the present invention.

FIG. 2 shows an X-ray diffraction chart of the sodium hexatitanate obtained. X-ray diffraction determination was carried out using an X-ray diffraction measurement device (product of Rigaku Industrial Corp., RINT 2000).

The sodium hexatitanate of this Example was determined to have a mean particle diameter (median diameter) of 3.1 μm. Its specific surface area was 2.43 m$^2$/g.

Also, the sodium hexatitanate of this Example has an indeterminate shape, as shown in FIG. 1, and is apparently different in shape from the conventional fibrous or granular sodium titanate.

Example 2

Manufacturing Method via Sodium Trititanate

In this Example, sodium hexatitanate was prepared according to the manufacturing method (b) of the present invention.

(Preparation of Milled Mixture)

555 g of titanium oxide and 245 g of sodium carbonate were mixed in a Henshel mixer. The resulting mixture was further mixed while milled in a vibration mill for 0.5 hours. Ti:Na (molar ratio) was 3.0:1.0.

(Preparation of Sodium Trititanate)

The thus-obtained milled mixture, weighing 50 g, was packed in a crucible and fired in an electric furnace at 900° C. for 4 hours to obtain sodium trititanate.

(Acid Treatment and Firing)

The obtained sodium trititanate was used to prepare 450 ml of a 10 wt. % slurry, followed by 3 hours of stirring. The slurry was adjusted to a pH of 7.1 by addition of 10.02 g of a 70 wt. % aqueous solution of $H_2SO_4$ and subsequent one-hour stirring. This slurry was separated by filtration, dried and then fired in an electric furnace at 550° C. for 1 hour.

The product obtained as a result of the firing was disintegrated by a hammer mill to obtain 35.6 g of sodium hexatitanate.

Figure 3:
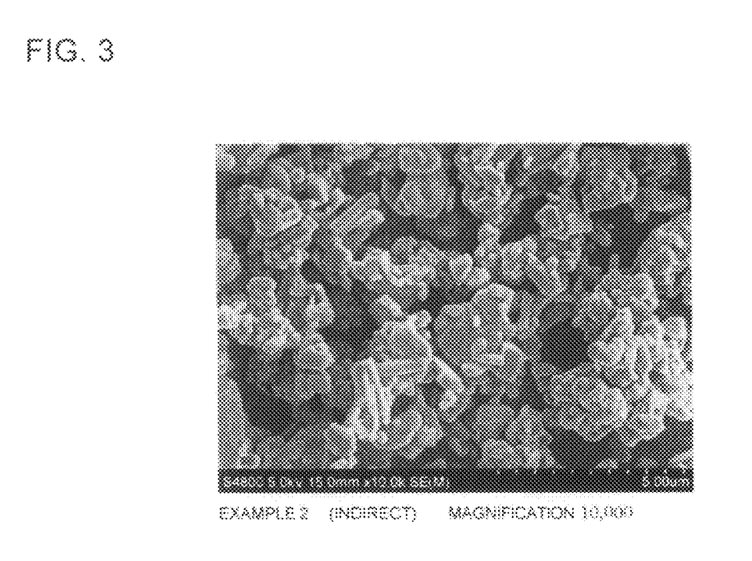
FIG. 3 is a photomicrograph taken using a scanning electron microscope, showing the sodium hexatitanate in Example 2 in accordance with the present invention.

This sodium hexatitanate was observed with a scanning electron microscope (SEM). FIG. 3 is a photomicrograph of the sodium hexatitanate when taken using a scanning electron microscope.

As can be clearly seen from FIG. 3, the obtained sodium hexatitanate has an indeterminate shape and is configured such that plural prismoidal particles are integrated in a randomly oriented fashion.

The sodium hexatitanate obtained was confirmed as having a composition of $Na_2Ti_6O_{13}$ by fluorescent X-ray analysis.

Figure 4:
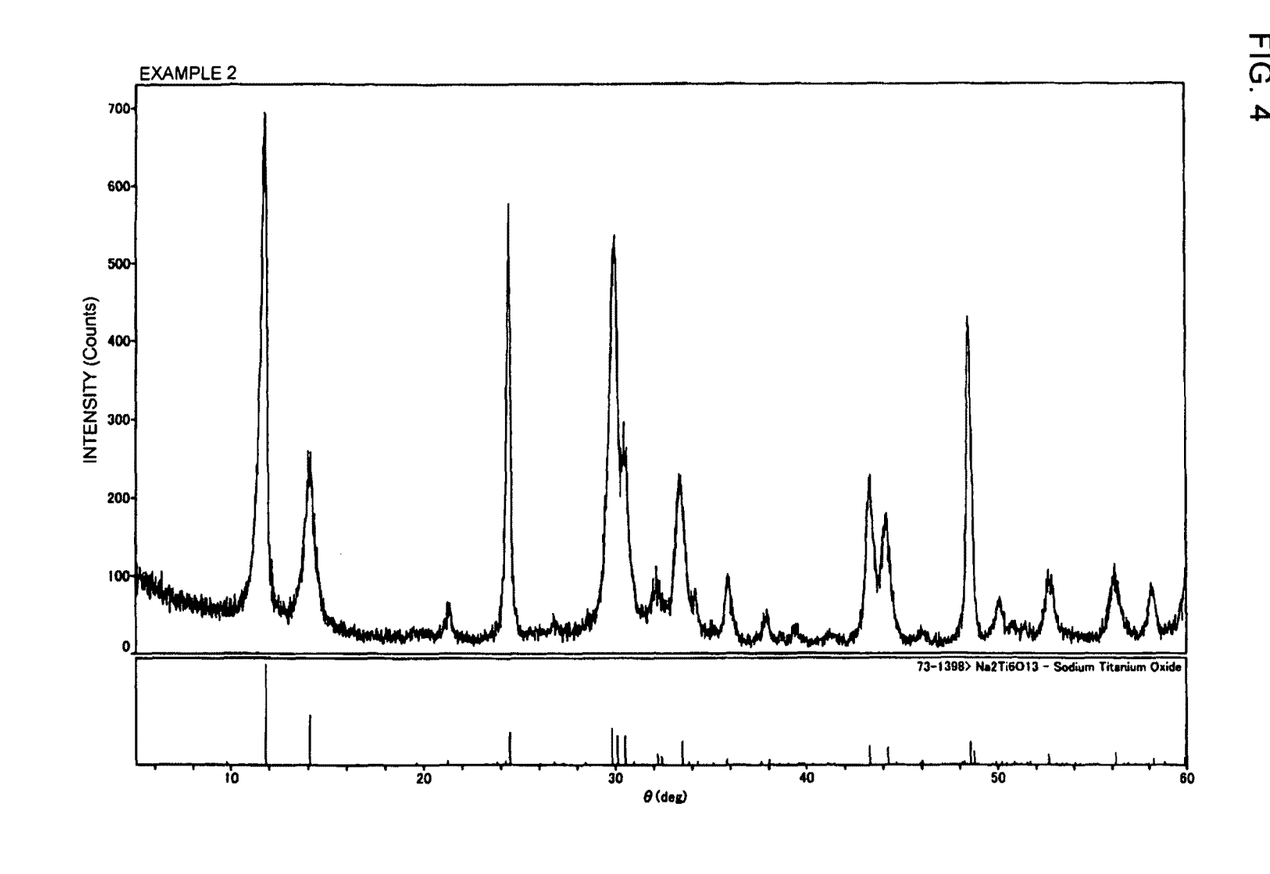
FIG. 4 shows an X-ray diffraction chart of the sodium hexatitanate obtained in Example 2 in accordance with the present invention.

FIG. 4 shows an X-ray diffraction chart of the sodium hexatitanate obtained. X-ray diffraction determination was carried out using an X-ray diffraction measurement device (product of Rigaku Industrial Corp., RINT 2000).

The sodium hexatitanate of this Example was determined to have a mean particle diameter (median diameter) of 3.4 µm. Its specific surface area was 3.13 $m^2/g$.

Also, the sodium hexatitanate of this Example has an indeterminate shape, as shown in FIG. 3, and is apparently different in shape from the conventional fibrous or granular sodium titanate.

Comparative Example 1

Fibrous Sodium Hexatitanate (Preparation of Milled Mixture)

468 g of titanium oxide, 207 g of sodium carbonate and 125 g of sodium chloride were mixed in a Henshel mixer for 0.5 hours.

(Preparation of Sodium Trititanate)

The thus-obtained milled mixture, weighing 50 g, was packed in a crucible and fired in an electric furnace at 900° C. for 4 hours.

(Acid Treatment and Firing)

The obtained sodium trititanate was used to prepare 450 ml of a 10 wt. % slurry, followed by 3 hours of stirring. The slurry was adjusted to a pH of 7.0 by addition of 7.43 g of a 70 wt % aqueous solution of $H_2SO_4$ and subsequent one-hour stirring. This slurry was separated by filtration, dried and then fired in an electric furnace at 600° C. for 1 hour.

The product obtained as a result of the firing was disintegrated by a hammer mill to obtain 24.6 g of sodium hexatitanate.

Figure 5:
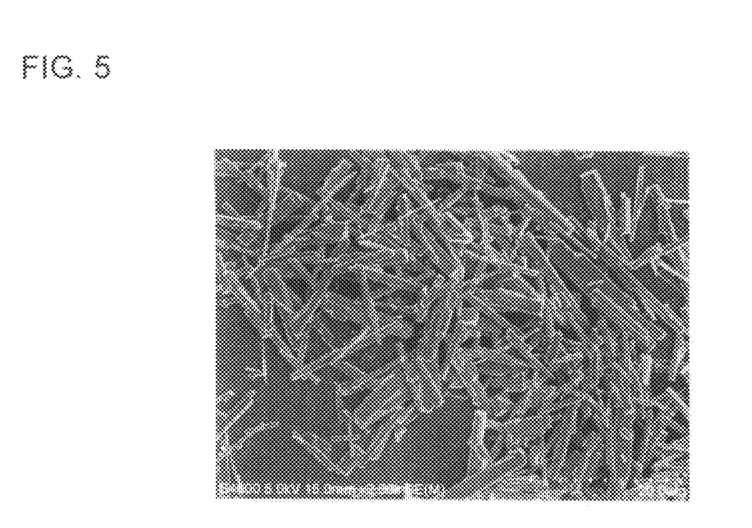
FIG. 5 is a photomicrograph taken using a scanning electron microscope, showing the fibrous sodium hexatitanate in Comparative Example 1.

This sodium hexatitanate was observed with a scanning electron microscope (SEM). FIG. 5 is a photomicrograph of the sodium hexatitanate when taken using a scanning electron microscope.

As can be clearly seen from FIG. 5, the obtained sodium hexatitanate has a fibrous shape.

The sodium hexatitanate obtained was confirmed as having a composition of $Na_2Ti_6O_{13}$ by fluorescent X-ray analysis.

Figure 6:
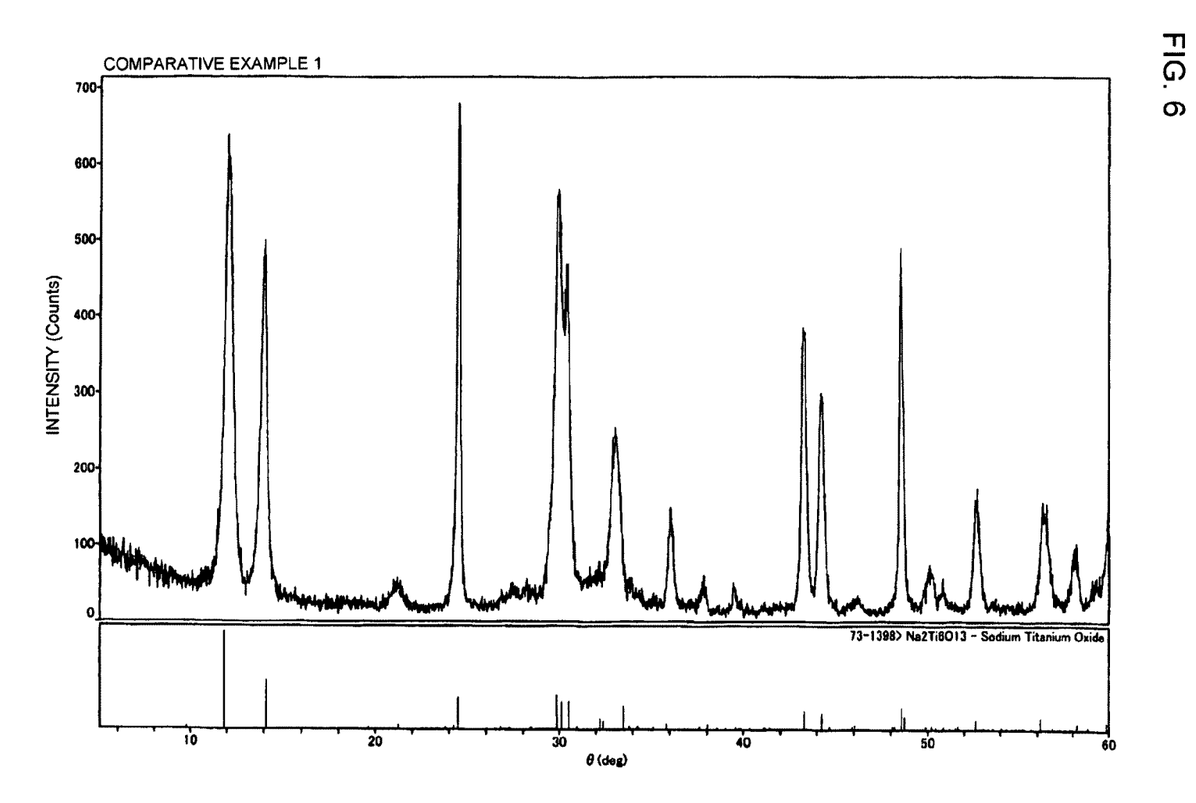
FIG. 6 shows an X-ray diffraction chart of the fibrous sodium hexatitanate obtained in Comparative Example 1.

FIG. 6 shows an X-ray diffraction chart of the sodium hexatitanate obtained. X-ray diffraction determination was carried out using an X-ray diffraction measurement device (product of Rigaku Industrial Corp., RINT 2000).

The sodium hexatitanate of this Comparative Example was determined to have a mean fiber diameter of 0.74 µm and a mean fiber length of 6.5 µm. Its specific surface area was 4.25 $m^2/g$.

Figure 12:
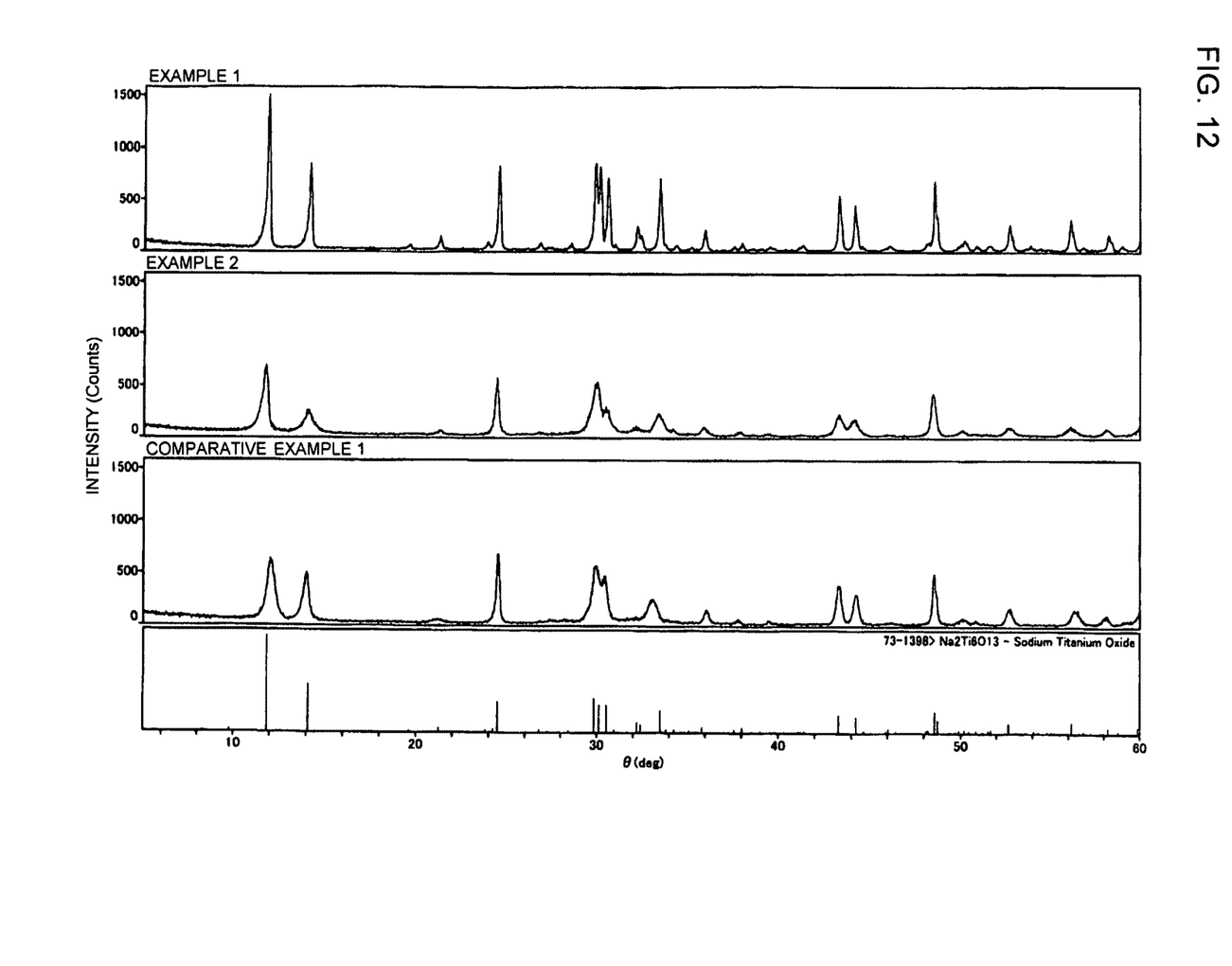
FIG. 12 shows X-ray diffraction charts of the respective sodium hexatitanates in Examples 1 and 2 in accordance with the present invention as well as in Comparative Example 1.

FIG. 12 shows respective X-ray diffraction charts of the sodium hexatitanates of Examples 1 and 2 and Comparative Example 1, collectively. FIG. 12 also shows literature values for the X-ray diffraction chart of sodium hexatitanate ($Na_2Ti_6O_{13}$).

(Measurement of Particle Size Distribution of Sodium Hexatitanate)

The sodium hexatitanates obtained in Examples 1 and 2 were measured for particle size distribution. The particle size distribution was determined using a laser diffraction type particle-size distribution measurement device.

The sodium hexatitanates obtained in Examples 1 and 2 were disintegrated using a vibration mill. D10, D50, D90 and standard deviation were determined for each sodium hexatitanate before disintegration, after 10 minutes from disintegration and after 120 minutes from disintegration. The measurement results are shown in Tables 1 and 2.

TABLE 1

|  | Example 1 Before Disintegration | Example 1 After 10 min. from Disintegration | Example 1 After 120 min. from Disintegration |
| --- | --- | --- | --- |
| D10 | 1.73 | 1.37 | 0.66 |
| D50 | 3.12 | 2.93 | 2.00 |
| D90 | 5.41 | 5.64 | 4.18 |
| Standard Deviation | 0.278 | 0.332 | 0.333 |

TABLE 2

|  | Example 2 Before Disintegration | Example 2 After 10 min. from Disintegration | Example 2 After 120 min. from Disintegration |
| --- | --- | --- | --- |
| D10 | 1.43 | 1.45 | 0.60 |
| D50 | 3.41 | 3.47 | 2.06 |
| D90 | 15.95 | 7.43 | 4.94 |
| Standard Deviation | 0.475 | 0.374 | 0.360 |

Figure 7:
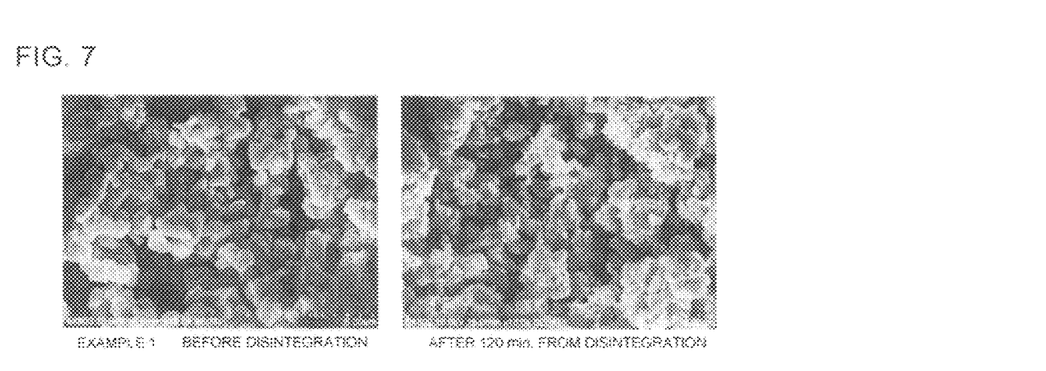
FIG. 7 is a photomicrograph taken using a scanning electron microscope, showing the sodium hexatitanate in Example 1 in accordance with the present invention prior to and subsequent to disintegration.
Figure 8:
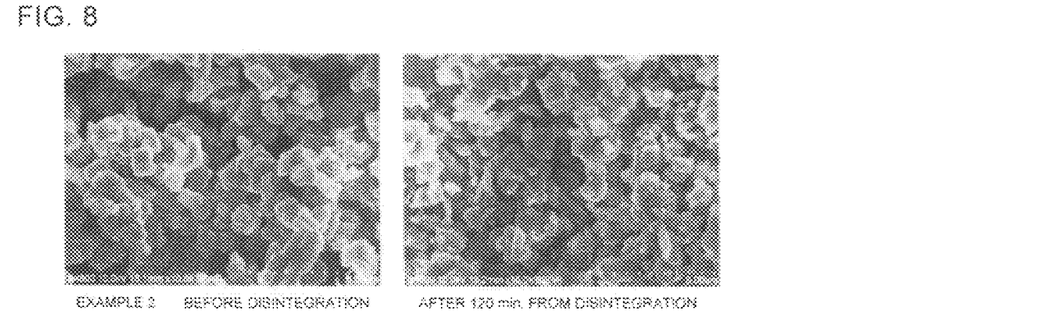
FIG. 8 is a photomicrograph taken using a scanning electron microscope, showing the sodium hexatitanate in Example 2 in accordance with the present invention prior to and subsequent to disintegration.

Also, an SEM photograph of the sodium hexatitanate of Example 1 before disintegration and after 120 minutes from disintegration is shown in FIG. 7 (Example 1) and FIG. 8 (Example 2).

Also, the fibrous sodium hexatitanate obtained in Comparative Example 1 was disintegrated by a vibration mill and its particle size distribution was measured in the same manner as described above. The measurement results are shown in Table 3.

TABLE 3

|  | Comp. Ex. 1 Before Disintegration | Comp. Ex. 1 After 10 min. from Disintegration | Comp. Ex. 1 After 120 min. from Disintegration |
|---|---|---|---|
| D10 | 1.54 | 0.98 | 0.56 |
| D50 | 6.25 | 4.38 | 1.51 |
| D90 | 19.85 | 14.63 | 4.05 |
| Standard Deviation | 0.422 | 0.432 | 0.318 |

Figure 9:
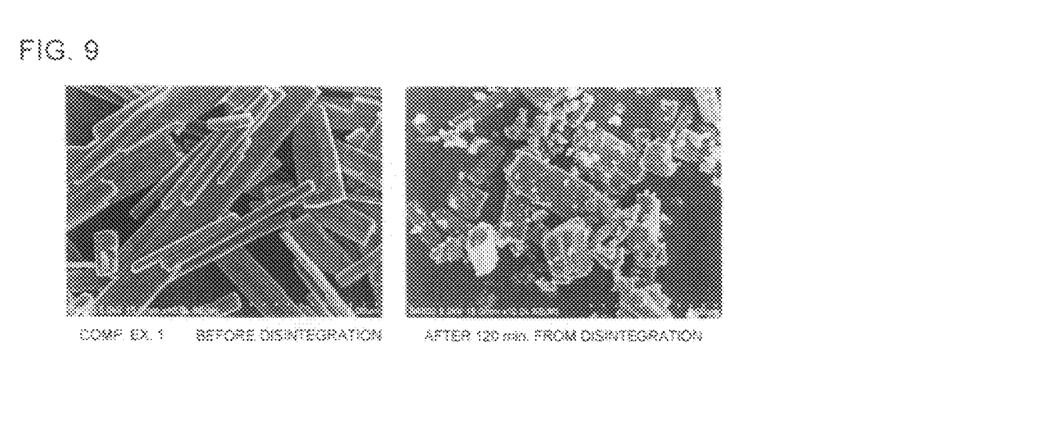
FIG. 9 is a photomicrograph taken using a scanning electron microscope, showing the sodium hexatitanate in Comparative Example 1 prior to and subsequent to disintegration.

Also, an SEM photograph of the fibrous sodium hexatitanate of Comparative Example 1 before disintegration and after 120 minutes from disintegration is shown in FIG. 9.

As can be clearly seen from the preceding Tables 1 and 2 and FIGS. 7 and 8, the sodium hexatitanates obtained in Examples 1 and 2, even if disintegrated by a vibration mill, do not experience marked particle diameter reduction, while a slight reduction is observed, and still retain their integrated forms. This demonstrates that the sodium hexatitanate of the present invention is not in the form of secondary particles resulting from agglomeration of prismoidal particles but has the form resulting from integration of prismoidal particles.

(Performance as Friction Modifier in Friction Material)

All "parts" in the following Examples refer to "parts by weight".

Example 3

Sodium Hexatitanate Made by Direct Method 20 parts of the sodium hexatitanate obtained in Example 1, 10 parts of aramid fibers, 20 parts of a phenol resin and 50 parts of barium sulfate were mixed, preformed under a pressure of 8.6 MPa for 1 minute, integrated in a mold under a pressure of 15 MPa at a temperature of 150° C. for 5 minutes and subsequently subjected to a heat treatment at 180° C. for 3 hours. The product was removed from the mold and then subjected to abrasive machining to prepare a disk pad A (JIS D 4411 test piece).

Example 4

Sodium Hexatitanate Made via Sodium Trititanate 20 parts of the sodium hexatitanate obtained in Example 2, 10 parts of aramid fibers, 20 parts of a phenol resin and 50 parts of barium sulfate were mixed, preformed under a pressure of 8.6 MPa for 1 minute, integrated in a mold under a pressure of 15 MPa at a temperature of 150° C. for 5 minutes and subsequently subjected to a heat treatment at 180° C. for 3 hours. The product was removed from the mold and then subjected to abrasive machining to prepare a disk pad B (JIS D 4411 test piece).

Comparative Example 2

Fibrous Sodium Hexatitanate 20 parts of the fibrous sodium hexatitanate obtained in Comparative Example 1, 10 parts of aramid fibers, 20 parts of a phenol resin and 50 parts of barium sulfate were mixed, preformed under a pressure of 8.6 MPa for 1 minute, integrated in a mold under a pressure of 15 MPa at a temperature of 150° C. for 5 minutes and subsequently subjected to a heat treatment at 180° C. for 3 hours. The product was removed from the mold and then subjected to abrasive machining to prepare a disk pad C (JIS D 4411 test piece).

Test Example 1

Friction Material—Frictional Wear Test

For the disk pads A, B and C obtained in Examples 3 and 4 and Comparative Example 2, a constant-speed frictional wear test (friction disk surface: made of FC-25 gray cast iron, surface pressure: 0.98 MPa, friction speed: 7 m/sec) was conducted according to the standard described in JIS D 4411 "Automobile Brake Lining" to measure a wear rate ($cm^3$/kgm) and a friction coefficient ($\mu$). The results are shown in FIGS. 10 and 11.

Figure 10:
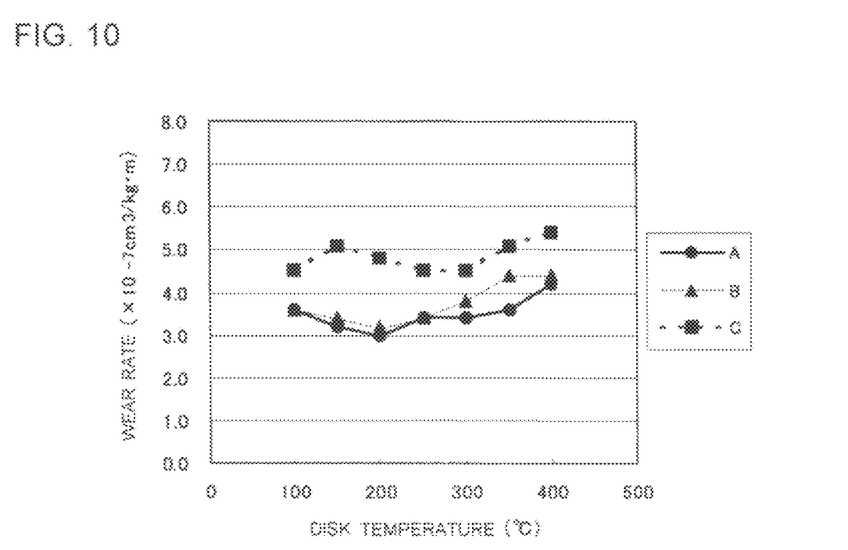
FIG. 10 is a graph, showing the disk temperature vs. wear rate relationship for the disk pads A-C.
Figure 11:
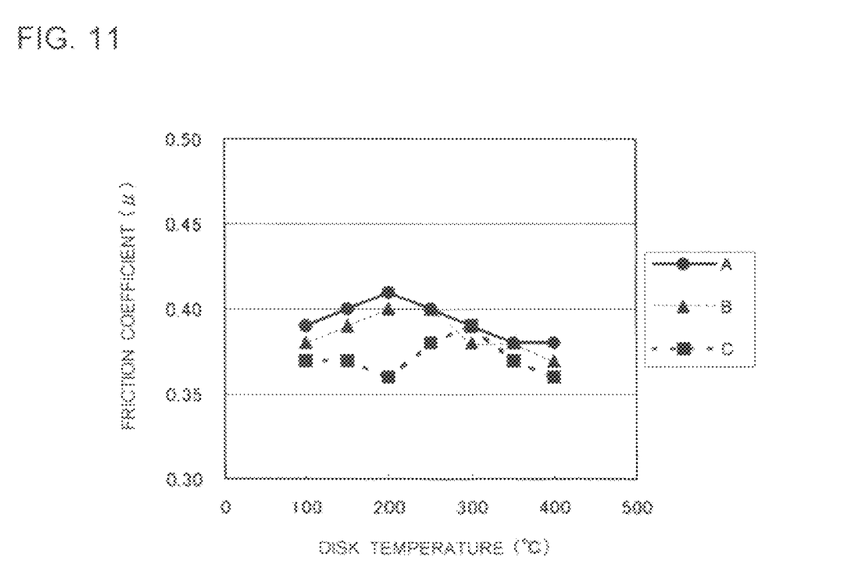
FIG. 11 is a graph, showing the disk temperature vs. wear coefficient relationship for the disk pads A-C.

As can be clearly seen from FIGS. 10 and 11, the disk pads A and B using the sodium hexatitanate of the present invention exhibit lower wear rates and superior wear resistance, compared to the disk pad C using the fibrous sodium hexatitanate.

The invention claimed is:

1. Sodium hexatitanate particles having a mean particle diameter in the range of 2-5 μm, and a configuration in which plural prismoidal particles of sodium hexatitanate are integrated in a randomly oriented fashion and not being in the form of secondary particles resulting from agglomeration of the prismoidal particles and not being in the form of platy particles.

2. The sodium hexatitanate particles as recited in claim 1, characterized in that the particles have a specific surface area of 2-4 $m^2$/g.

3. A friction material characterized as containing, as a friction modifier, the sodium hexatitanate particles recited in claim 1.

4. A friction material characterized as containing, as a friction modifier, the sodium hexatitanate particles manufactured by the method recited in claim 1.

5. A friction material characterized as containing, as a friction modifier, the sodium hexatitanate particles manufactured by the method recited in claim 1.

6. A method for manufacture of the sodium hexatitanate particles of claim 1 including the steps of:
    mixing a titanium source and a sodium source while milling them mechanochemically; and
    firing the milled mixture.

7. The method for manufacture of the sodium hexatitanate particles as recited in claim 6, characterized in that said mechanochemical milling is achieved by a vibration mill.

8. The method for manufacture of the sodium hexatitanate particles as recited in claim 6, characterized in that the milled mixture is fired at a temperature in the range of 650-1,000° C.

9. A method for manufacture of the sodium hexatitanate particles of claim 1 including the steps of:
    mixing a titanium source and a sodium source while milling them mechanochemically;
    firing the milled mixture to prepare sodium trititanate; and
    subsequent to an acid treatment that dissolves a sodium content, firing the sodium trititanate.

10. The method for manufacture of the sodium hexatitanate particles as recited in claim 9, characterized in that the sodium trititanate is fired at a temperature in the range of 400-700° C.

11. The method for manufacture of the sodium hexatitanate particles as recited in claim 9, characterized in that said mechanochemical milling is achieved by a vibration mill.

12. The method for manufacture of the sodium hexatitanate particles as recited in claim 9, characterized in that the milled mixture is fired at a temperature in the range of 650-1,000° C.

\* \* \* \* \*